United States Patent
Novikoff et al.

[11] Patent Number: 5,226,516
[45] Date of Patent: Jul. 13, 1993

[54] PROGRESSIVE ENGAGEMENT CLUTCH

[76] Inventors: John D. Novikoff, 2458 N. Merced Ave., S. El Monte, Calif. 91733; Oleg B. Krivenkoff, #104, 4900 N. Grand Ave., Covina, Calif. 91724

[21] Appl. No.: 919,913

[22] Filed: Jul. 27, 1992

[51] Int. Cl.$^5$ .............................................. F16D 13/50
[52] U.S. Cl. ................. 192/70.28; 192/70.12; 192/107 C
[58] Field of Search ............. 192/70.28, 70.27, 70.12, 192/70.14, 70.19, 70.21, 107 C, 113 A

[56] References Cited

U.S. PATENT DOCUMENTS

| | | | |
|---|---|---|---|
| 1,992,626 | 2/1935 | Nutt | 192/70.14 X |
| 2,053,622 | 9/1936 | Manning | 192/70.14 X |
| 2,101,410 | 12/1937 | Nutt et al. | 192/70.14 X |
| 2,659,468 | 11/1953 | Hobbs | 192/107 C X |
| 3,063,530 | 11/1962 | Rosenberger et al. | 192/70.14 |
| 3,323,328 | 6/1967 | Montgomery | 192/70.14 X |
| 3,613,848 | 10/1971 | Reiff | 192/70.28 |
| 3,809,200 | 5/1974 | Smales | 192/107 C |
| 4,113,078 | 9/1978 | Maycock | 192/107 C |
| 4,548,306 | 10/1985 | Hartz | 192/70.28 |
| 4,802,564 | 2/1989 | Stodt | 192/70.28 |
| 4,919,243 | 4/1990 | Floton | 192/107 R X |
| 4,967,892 | 11/1990 | Tojima et al. | 192/107 C |
| 4,993,531 | 2/1991 | Villata | 192/107 C |
| 5,048,659 | 9/1991 | Tojima | 192/107 C |

FOREIGN PATENT DOCUMENTS 571156  2/1959  Canada .............................. 192/70.14

Primary Examiner—Rodney H. Bonck
Assistant Examiner—Andrea Pitts
Attorney, Agent, or Firm—Boniard I. Brown

[57] ABSTRACT

A progressive engagement clutch having a compressible clutch plate assembly mounted between the clutch flywheel and pressure plate. The clutch plate assembly has a pair of outer clutch plates, a center wave spring plate coaxially mounted on a hub for axial movement relative to one another and to the hub, and clutch facings on the outer sides of the outer plates engagable with clutch facings on the flywheel and pressure plate. During clutch engagement, the clutch plate assembly and its spring are progressively compressed between the flywheel and pressure plate until the clutch plates are finally firmly gripped between the flywheel and pressure plate to permit torque transmission through the clutch without chattering, excessive stress on the clutch or transmission coupled to the clutch, and other problems associated with conventional clutches. The clutch plates have slots and openings which aid cooling of the plates, expulsion of particles and dirt from the plate assembly, and firm frictional contact of the clutch facings.

26 Claims, 2 Drawing Sheets

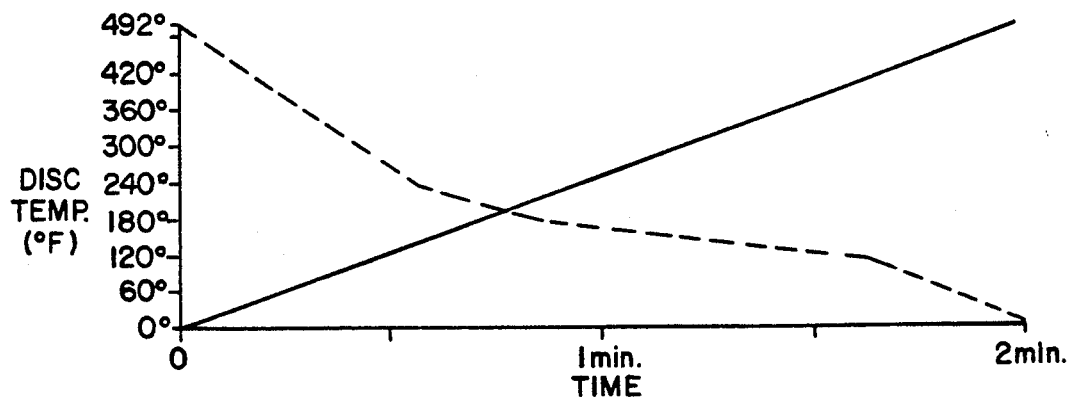
FIG.—4
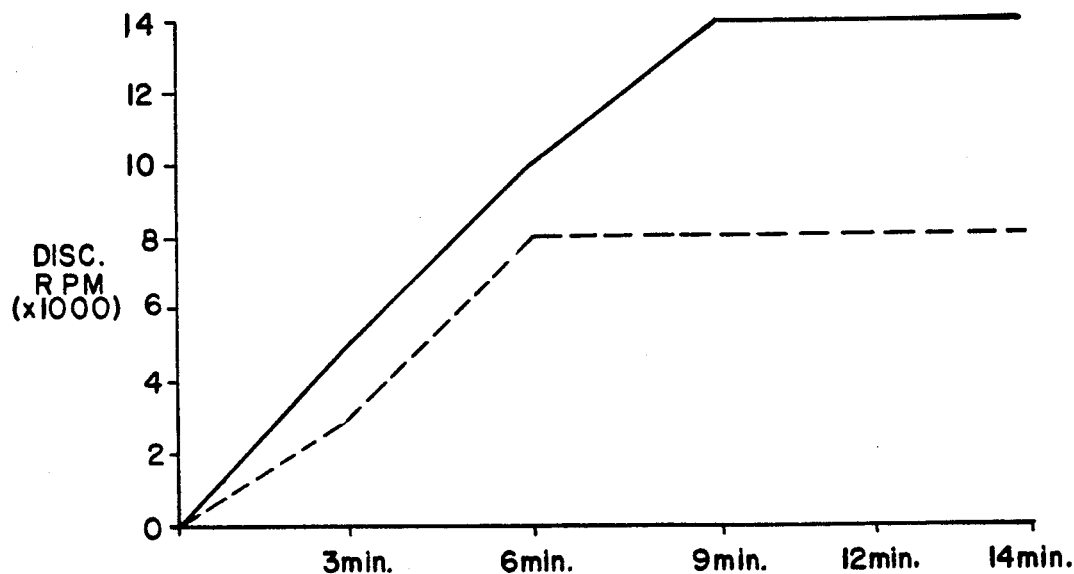
FIG.—5

PROGRESSIVE ENGAGEMENT CLUTCH

BACKGROUND OF THE INVENTION

1. Field of the Invention

This invention relates generally to clutches for transmitting torque from a rotary driving shaft to a rotary driven shaft, and more particularly to an improved progressive engagement clutch and a compressible clutch plate assembly for the clutch.

2. Prior Art

The improved clutch and clutch plate assembly of this invention is designed primarily for use on automotive vehicles and will be described primarily in this context. It will become readily evident as the description proceeds, however, that the clutch and clutch plate assembly are capable of general use for drivably coupling any rotary driving shaft to a rotary driven shaft.

In many automotive vehicles, driving torque is transmitted from the crankshaft of the vehicle engine to the vehicle drive shaft through a clutch controlled by a clutch pedal operable by the vehicle driver. Simply stated, such a clutch includes a flywheel fixed to the engine crankshaft, a pressure plate coaxially disposed opposite the flywheel clutch facings on the adjacent sides of the flywheel and pressure plate, a clutch plate between the flywheel and pressure plate having clutch facings at opposite sides and drivably coupled to the vehicle drive shaft, and means operatively connecting the pressure plate to the clutch pedal whereby release of the of the pedal effects movement of the pressure plate toward the flywheel to a normal engaged position, and depression of the pedal retracts the pressure plate away from the flywheel to a disengaged position. When the pressure plate occupies its engaged position, the clutch plate is firmly gripped between the flywheel and pressure plate with the clutch plate clutch facings disposed in firm frictional driving contact with the flywheel and pressure plate clutch facings. The clutch plate is then drivably coupled to the flywheel for torque transmission through the clutch from the engine crankshaft to the vehicle drive shaft. When the pressure plate occupies its retracted disengaged position, the clutch plate is released from the flywheel for free rotation of the flywheel and clutch plate independently of one another, and torque transmission through the clutch is discontinued.

The prior art is replete with a vast assortment of clutches of the class described. By way of example, following is a list of patents relating to such clutches: U.S. Pat. Nos. 1,588,305; 2,091,409; 2,190,994; 2,607,445; 2,888,122; 3,180,470; 3,371,756; 3,584,718; 4,409,090; 4,180,622; 4,516,672; 4,629,047. U.S. Pat. No. 4,516,672 discloses a progressive engagement clutch.

Existing clutches suffer from various operational defects or problems. Among the more common of these are the following: chattering, particularly during clutch engagement; overheating which degrades the clutch components; glazing of the clutch facings due to overheating and slippage between the clutch facings; relatively rough clutch engagement and disengagement; undesirable stressing of a transmission coupled to the clutch; accumulation of particles and the like within the clutch which degrades its performance; and others. These defects are due, in large part, to the fact that the clutches engage relatively abruptly.

SUMMARY OF THE INVENTION

This invention provides an improved progressive engagement clutch and a compressible clutch plate assembly for the clutch which avoid the above noted and other defects of the existing clutch plate assemblies and clutches. The improved clutch plate assembly includes a hub having a central rotation axis, a pair of outer clutch plates coaxially mounted on the hub, clutch facings on the outer sides of the clutch plates, compression spring means between the plates which urges the plates apart, and connecting means joining the clutch plates to one another and to the hub for rotation of the hub with the clutch plates and independent movement of each plate along the hub. Accordingly, each clutch plate is movable axially relative to the hub toward and away from the other clutch plate, and the two clutch plates are axially movable relative to the hub toward and away from one another. In the preferred clutch plate assembly of the invention, the spring means of the clutch plate assembly is a unique wave spring plate, sometimes referred to as a marcel spring or marcel spring plate. For convenience, the plate assembly spring means or spring plate is referred to herein in places simply as a spring.

The improved clutch of the invention includes, in addition to the improved clutch plate assembly, a flywheel and pressure plate coaxially disposed at opposite sides of the plate assembly and having clutch facings opposite the adjacent clutch facings on the plate assembly, and means for moving the pressure plate axially toward the flywheel to engage the clutch and away from the flywheel to disengage the clutch. During clutch engagement, the two outer clutch plates are urged toward one another, thereby compressing the clutch plate assembly and its spring against the force of the spring, until the outer clutch plates and spring are finally firmly gripped between the flywheel and pressure plate. The clutch facings on the flywheel and pressure plate are then disposed in firm frictional driving contact with their adjacent plate assembly clutch facings to drivably couple the flywheel to the clutch plate assembly for torque transmission through the clutch from the engine crankshaft to the vehicle drive shaft. During clutch disengagement, the clutch plate assembly is released for separation from the flywheel and pressure plate clutch facings to effectively disconnect the vehicle drive shaft from the engine crankshaft. The plate assembly spring urges the two outer clutch plates apart, that is the plate assembly expands, during this disengagement.

The clutch plate assembly thus effects progressive engagement of the clutch in a manner which is designed to avoid the clutch problems mentioned earlier, namely chattering, relatively rough clutch engagement and disengagement, glazing of the clutch facings, and excessive transmission stress. According to another important feature of the invention, the clutch plates of the clutch plate assembly are constructed of a metal, such as aluminum, having high thermal conductivity, and are preferably coated to achieve a relatively high rate of heat dissipation from the plates which prevents overheating of the clutch. According to a further important feature, the plates of the clutch plate assembly are slotted and apertured in a manner which aids cooling of the plates, expulsion of particles and dirt from the plate assembly, and aids in firm frictional contact of the clutch facings.

BRIEF DESCRIPTION OF THE DRAWINGS

FIGS. 4-5 illustrate graphs depicting certain operating characteristics of the improved clutch and clutch plate assembly.

DESCRIPTION OF THE PREFERRED EMBODIMENT

Figure 1:
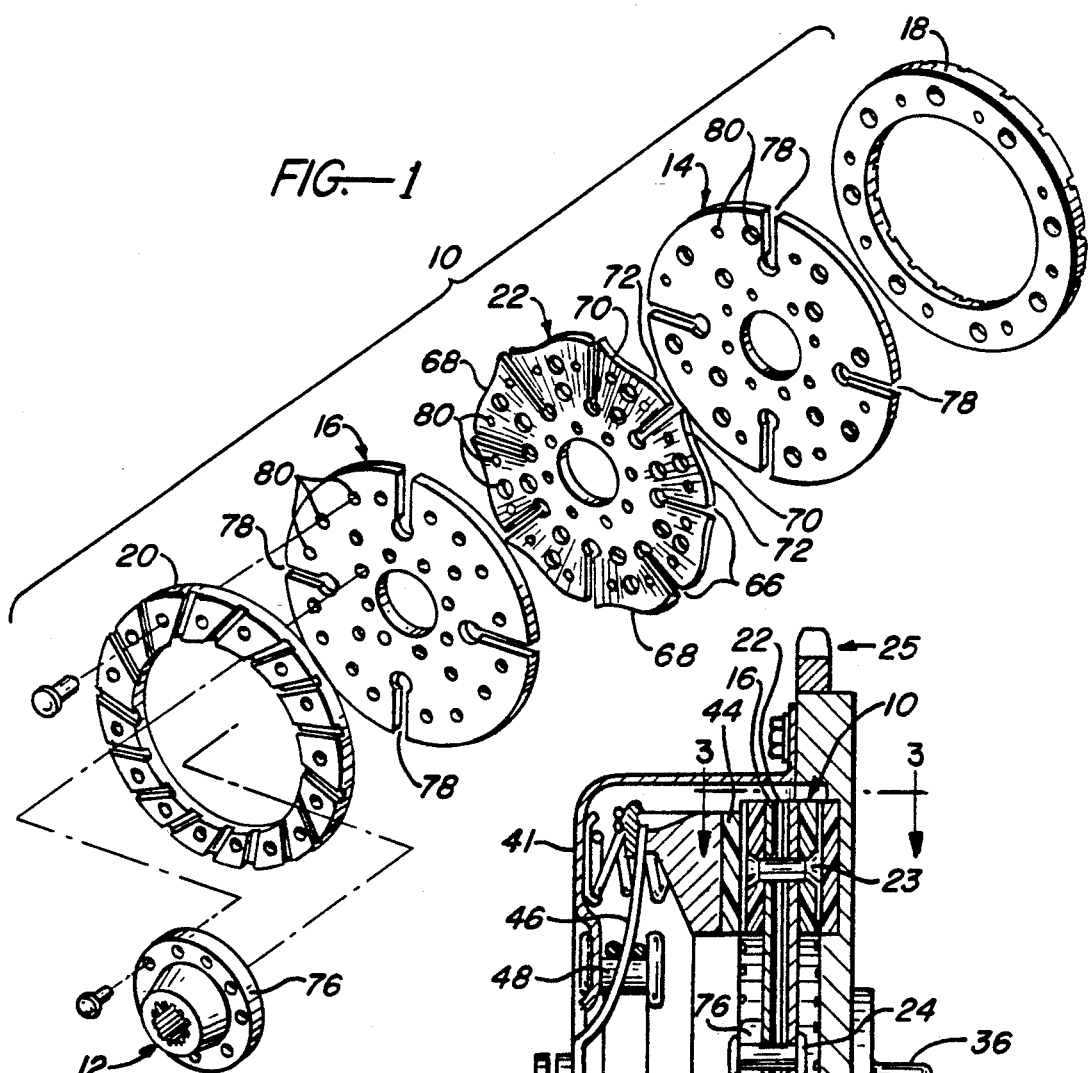
FIG. 1 is an exploded perspective view of the improved clutch plate assembly of the invention.
Figures 2, 3:
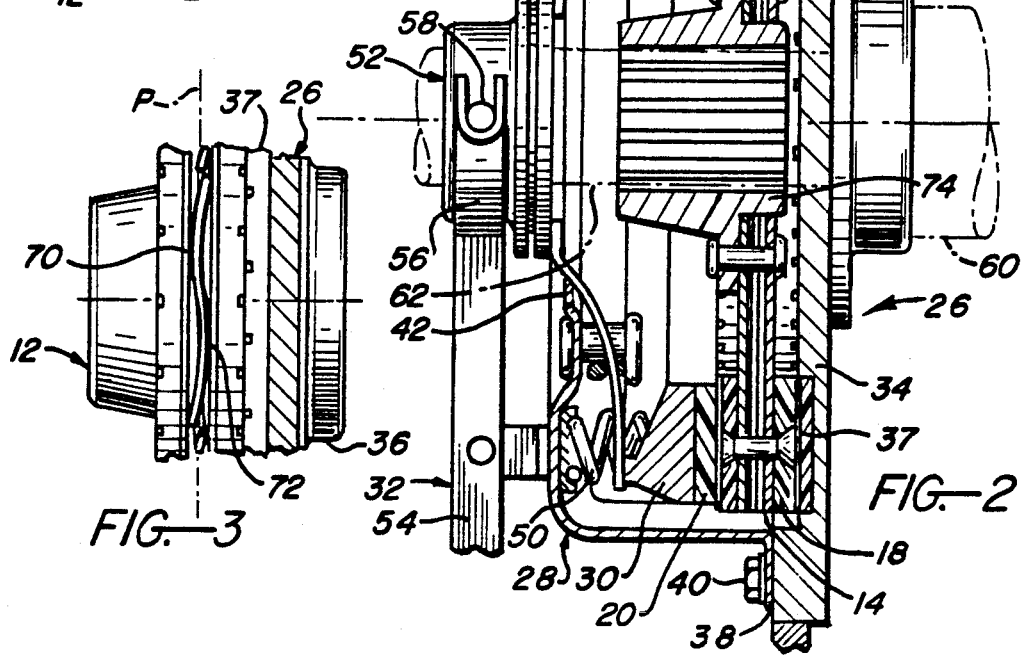
FIG. 2 is a section through a clutch embodying the improved clutch plate assembly of the invention.
FIG. 3 is a section on slightly enlarged scale taken on line 3—3 in FIG. 2.

Referring now to these drawings and first to FIGS. 1-3, the illustrated improved clutch plate assembly 10 of the invention comprises a hub 12 having a central rotation axis and two outer clutch plates 14, 16 coaxially mounted on the hub. Mounted on the outer sides of the clutch plates are clutch facings 18, 20. Situated between the clutch plates 14, 16 is a compression spring 22 which urges the plates apart. The clutch plates 14, 16 and spring 22 are joined to one another and to the hub 12 by means 23, 24 which drivably connect the hub to the plates for rotation of the hub with the plates and which both permit and limit axial movement of the plates and spring relative to one another and to the hub.

The clutch 25 illustrated in FIG. 3 incorporates the improved clutch plate assembly 10 and except for this plate assembly is conventional. Accordingly, it is necessary to describe the clutch 25 only in such detail as is necessary to a full understanding of this invention. With this in mind, the clutch 25 includes a flywheel 26, a housing 28, a pressure plate 30, and clutch operating means 32 for moving the pressure plate to engage and disengage the clutch, as described later. The flywheel 26 includes a circular flywheel portion 34 having a coaxial hub 36. Coaxially mounted on the left side of the flywheel portion 34 in the drawings is a clutch facing 37. The clutch housing 28 is generally cup or bowl shaped and includes an outwardly directed circumferential flange 38 about its open side. The housing is coaxially disposed at the left side of the flywheel 26 in the drawings with its flange 38 seating against the circular wheel portion 34 and is secured to the flywheel by bolts 40 extending through the flange and circular wheel portion. The housing has an end wall 41 containing a relatively large central opening 42.

The pressure plate 30 is situated within the clutch housing 28, and comprises a ring coaxial with the flywheel 26. Mounted on the right side of this ring in the drawings is a clutch facing 44 opposite the flywheel clutch facing 37. The pressure plate is supported on the housing 28 for axial movement toward and away from the flywheel 26 by a multiplicity of levers 46 pivotally supported between their ends on fulcrums 48 fixed to the housing wall 41. Compression springs 50 acting between the pressure plate 30 and the housing wall 41 urge the pressure plate toward the flywheel. The levers 46 extend generally radially with respect to the axis of the clutch. The radially outer ends of the levers pivotally engage the pressure plate 30 in such a way that pivoting of the levers in one direction on their fulcrums 48 retracts the pressure plate away from the flywheel 26 against the force of the springs 50. The radially inner ends of the levers 46 extend through the housing opening 42.

The clutch operating means 32 comprises a collar 52 coaxial with the flywheel 26 and having a circumferential groove about its right end in the drawings in which the radially inner ends of the clutch levers 46 slidably engage. A clutch operating lever 54 pivoted on the clutch housing end wall 41 has a yoke 56 at one end. The yoke arms straddle the collar 52 and are pivotally connected to the collar by pins 58 engaging in slots in the the yoke arms in such a way that pivoting of the clutch operating lever 54 moves the collar axially. Right hand axial movement of the collar in the drawings pivots the clutch levers 46 in directions to retract the pressure plate away from the flywheel 26 against the force of the springs 50. Left hand movement of the collar pivots the clutch levers in the opposite directions to effect extension of the pressure plate toward the flywheel aided by the force of the springs 50.

In use, the clutch flywheel 26 is rigidly connected to a driving shaft 60. The hub 12 of the clutch plate assembly 10 is slidably mounted on and splined to a rotary driven shaft 62. The collar 52 of the clutch operating means 32 is slidably and rotatably mounted on the driven shaft. In the case of an automotive vehicle, the driving shaft 60 is the engine crankshaft, and the driven shaft 62 is the vehicle drive shaft. The clutch operating lever 54 is connected to the vehicle clutch pedal (not shown) in such a way that when the pedal is released, the collar 52 and the pressure plate 30 occupy their normal positions of FIG. 3. This normal position of the pressure plate is its engaged position. In this normal position, the clutch plates 14, 16 and spring 22 of the clutch plate assembly 10 are firmly gripped between the flywheel 26 and the pressure plate 30, the spring is compressed between the clutch plates, and the opposing clutch facings 18, 37 on the clutch plate 14 and the flywheel and opposing clutch facings 20, 44 on the clutch plate 16 and pressure plate 30 are held in firm face-to-face frictional driving contact. The clutch 25 is then engaged to transmit driving torque from the driving shaft 60 through the flywheel 26 and the clutch plate assembly 10 to the driven shaft 62. Depression of the clutch pedal rotates the clutch operating lever 54 in a direction to retract the pressure plate 30 to the left in the drawings away from the flywheel 26 to a disengaged position wherein the clutch plate assembly 10 is released from from frictional driving contact with the flywheel. The clutch 25 is now disengaged, and no driving torque is transmitted through the clutch.

During disengagement of the clutch 25 in response to depression of the clutch pedal, the spring 22 of the clutch plate assembly 10 urges the clutch plates 14, 16 apart to their separated positions of FIGS. 2 and 3. Such separation movement of the clutch plates by the spring is limited to these separated positions by the connecting means 23, 24 which join clutch plates to one another and to the assembly hub 12. During engagement of the clutch by right hand movement of the pressure plate 30 to its engaged position in response to release of the clutch pedal, the outer clutch plates 14, 16 are urged toward one another, thereby compressing the spring 22 between the plates, and hence the clutch plate assembly as a whole. Thus, the clutch plate assembly 10 is resiliently compressed between the flywheel 25 and the pressure plate 30 during engagement of the clutch 25, and the clutch plate assembly resiliently expands during disengagement of the clutch. As noted earlier, the clutch plates 14, 16 and spring 22 of the clutch plate assembly 10 are free to move axially relative to one another and to hub 12 during engagement and disengagement of the clutch. This resilient compression and expansion of the clutch plate assembly and freedom of movement of the clutch plates relative to one another and the hub during engagement and disengagement of the clutch effects progressive driving engagement and disengagement of the flywheel 26 to and from the clutch plate assembly 10 in a manner which minimizes if not eliminates chattering of the clutch, particularly during clutch engagement, effects smooth clutch engagement and disengagement, reduces stress on a transmission coupled to the clutch, and inhibits glazing of the clutch facings.

In the preferred clutch plate assembly illustrated, the spring 22 is a wave spring plate, sometimes referred to as a marcel spring. This wave spring plate is a spring steel plate having a medial plane P normal to the axis of the plate assembly and eight radial slots 66 uniformly circumferentially spaced about and opening through the outer perimeter of the spring plate. Slots 66 form spring vanes 68 between the adjacent slots which are resiliently flexible transverse to the medial plane. Each wave plate vane 68 has first and second shallow trough-like arcuate portions 70, 72 extending generally radially of the vane and spaced circumferentially of the spring plate. The arcuate vane portions 70, 72 have convex sides which project substantially equal distances to opposite sides of the medial plane P and reverse sides which are concave in the normal unstressed condition of the spring plate. As may be observed in FIGS. 1 and 2, the convex sides of the vane portion 70 all project to one side of the medial plane, and the convex sides of the vane portions 72 all project beyond the opposite side of the medial plane in the normal unstressed condition of the spring plate. The convex sides of the vane portions 70, 72 bear against the clutch plates 16, 14, respectively, and urge these plates apart. When the outer clutch plates 14, 16 are urged toward one another during engagement of the clutch, the arcuate spring plate vanes are deformed toward a flattened shape and thereby store elastic strain energy which urges the outer plates apart when the clutch is disengaged.

The illustrated plate assembly hub 12 has a cylindrical portion 74, and the three clutch plates 14, 16, 22 have central bores slidably receiving the cylindrical hub portion. Circumferentially surrounding this hub portion in a plane normal to the axis of the hub is a clutch plate mounting portion in the form of a flange 76. Connecting means 23 comprise rivet-like fasteners which extend through aligned holes in the clutch plates. The connecting means 24 comprise rivet-like fasteners which extend through aligned holes in the clutch plates and the hub flange 76. Fasteners 23, 24 connect the three clutch plates to one another and to the hub 12 in such a way as to (a) drivably couple the plates to the hub for rotation of the hub with the plates, (b) permit axial movement of the plates relative to one another and relative to the hub 12, (c) limit relative separation of the clutch plates, and (d) join the clutch plates and hub against axial separation.

According to an important feature of the invention, the two outer clutch plates 14, 16 contain radial slots 78, and all three clutch plates contain a multiplicity of different sized holes 80 between their slots. The number and arrangement of these holes is determined by clutch facing standards (Frictional Materials Standards Institute); to avoid excessive stress buildup and cracking. During clutch operation, air circulates through the holes and slots to cool the clutch plates. Moreover, some of the holes in the spring plate 22 are covered by the outer clutch plates 14, 16 when the clutch is engaged and trap air which is heated and thereby pressurized during clutch operation. Pressurizing of this trapped air aids the spring plate in separating the outer clutch plates when the clutch is disengaged. Moreover, when the clutch is disengaged, the pressurized air trapped in the spring plate holes is released for expansion and radial outward expulsion by centrifugal force in such a way that it further cools the spring plate and expels particles and dirt from between the clutch plates. The combined cooling effect of air circulation through the clutch plate slots 66, 78 and holes 80, and expansion of air trapped within the spring plate holes, and the high heat dissipation characterics, discussed below, of the preferred outer clutch plates 14, 16 serve to prevent overheating of the spring plate 22 and thereby preserve its heat treatment and proper spring characteristics.

The preferred clutch plates 14, 16 are stamped or otherwise formed from relatively light weight aluminum or other metal having relatively high thermal conductivity, whereby the plates are effective to dissipate heat at a relatively high rate. These plates are preferably coated with one of the known materials which enhance heat disipation from the plates. This high rate of heat dissipation from the outer clutch plates 14, 16 serves to cool their clutch facings 18, 20 and the spring plate 22 as well as the outer plates themselves. Cooling the clutch facings retards glazing and other degradation of the facings and thereby prolongs their service life. Another advantage achieved by the clutch plate slots and holes is a reduction in the weight of the clutch plate assembly 10 which results in less stess on and an increase in the service life of the clutch and a transmission connected to the clutch as well as smoother clutch engagement and disengagement.

The slots 78 in the outer clutch plates 14, 16 form vane-like portions between the adjacent slots which are flexible transversely of the planes of the plates. This flexible plate construction assures full face-to-face contact of the opposing clutch facings 18, 20, 37, 44 on the clutch plates 14, 16, flywheel 26, and pressure plate 30. The outer clutch plates also provide barriers between their clutch facings 18, 20 and the wave spring 22 which prevent indentation of the facings by the spring which would shorten the service life of the facings.

It will be evident from the foregoing that the invention provides an improved clutch plate assembly and clutch which avoid the earlier noted and other defects and disadvantages of existing clutches. In this regard, attention is directed to FIGS. 4–6 which depict pertinent operating characteristics of the clutch and plate assembly, demonstrated by spin test results. As shown in the graph of FIG. 4, rapid clutch disc cooling is effected from a maximum temperature at standstill. In testing, clutch disc face temperature drops, with no load, from such temperatures as 492° F. to 0° C. in two minutes. The maximum clutch face temperature might be 350° under load. As indicated in the graph in FIG. 5, in tests the rpm of a disc flywheel increases rapidly from a vehicle standstill. The inclined portions of the graph of FIG. 5 represent disc rpm increases resulting from engine speed increase from an initial vehicle standstill.

Thus there has been shown and described a novel progressive engagement clutch which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. A clutch plate assembly comprising:
   a hub having a rotation axis,
   a pair of clutch plates coaxially mounted on said hub with the plates disposed in planes normal to said axis, thereby the plates have inner confronting sides and opposite outer sides,
   connecting means joining said clutch plates to one another and to said hub for limited movement of said plates along said axis relative to one another and to said hub,
   clutch facings on said outer clutch plate sides,
   spring means between said clutch plates urging said plates away from one another to separated limiting positions relative to one another and to said hub, and wherein
   said spring means comprises a spring plate between said clutch plates.

2. A clutch plate assembly according to claim 1 wherein:
   said spring plate comprises a wave spring plate between said clutch plates.

3. A clutch plate assembly according to claim 1 wherein:
   said hub includes a plate mounting portion,
   said connecting means comprise means securing said plates to one another and to said mounting portion.

4. A clutch plate assembly according to claim 6 wherein:
   said spring plate comprises a wave spring plate between said clutch plates.

5. A clutch plate assembly according to claim 3 wherein:
   said spring plate is positioned between said clutch plates and has an outer perimeter, a medial plane normal to said axis, and radial slots spaced circumferentially about and opening through the outer perimeter of the spring plate so as to form spring vanes between the adjacent slots which are resiliently flexible transverse to said plane and have radially outer extremities, and
   said vanes have unstressed states wherein the radially outer extremities of said vanes project substantially equal distances to opposite sides of said medial plane, and said vanes bear against said inner sides of said clutch plates to resiliently urge said clutch plates apart.

6. A clutch plate assembly according to claim 3 wherein:
   said spring plate comprises a wave spring plate between said clutch plates having an outer perimeter, a medial plane normal to said axis, and radial slots spaced circumferentially about and opening through the outer perimeter of the spring plate so as to form spring vanes between the adjacent slots which are resiliently flexible transverse to said plane, and wherein
   each vane has first and second arcuate portions extending radially of the vane and spaced circumferentially of the spring plate, said first arcuate portion has a convex side projecting to one side of said medial plane and an opposite concave side, said second arcuate portion has a convex side projecting to the opposite side of said medial plane and an opposite concave side, said arcuate vane portions have radially outer edges which together form the outer perimeter of said spring plate, said first and second arcuate vane portions are arranged in alternate sequence around the spring plate, said vanes have unstressed states wherein said convex vane portions project substantially equal distances to opposite sides of said medial plane in such a way that said spring plate outer perimeter has an undulating shape, and said convex vane portions bear against said inner sides of said clutch plates to urge said clutch plates apart.

7. A clutch plate assembly according to claim 1 wherein:
   said hub has a coaxial cylindrical portion and a radial flange surrounding said hub portion in a plane normal to said axis,
   said clutch plates are mounted on and movable along said hub portion, and
   said connecting means comprise means securing said plates to one another and to said flange.

8. A clutch plate assembly according to claim 1 wherein:
   said clutch plates comprise aluminum discs each having an outer perimeter, and circumferentially spaced radial slots opening through said outer perimeter and forming between the adjacent slots radial, laterally flexible vanes having outer sides at said outer sides of said clutch plates, and
   said clutch facings comprise facing rings coaxial with said discs and secured to the outer sides of said vanes.

9. A clutch plate assembly comprising:
   a hub having a rotation axis,
   a pair of clutch plates coaxially mounted on said hub with the plates disposed in planes normal to said axis, whereby the plates have inner confronting sides and opposite outer sides,
   connecting means joining said clutch plates to one another and to said hub for limited movement of said plates along said axis relative to one another and to said hub,
   clutch facings on said outer clutch plate sides,
   spring means between said clutch plates urging said plates away from one another to separated limiting positions relative to one another and to said hub, and wherein
   said hub has a coaxial cylindrical portion and a radial flange surrounding said hub portion in a plane normal to said axis,
   said clutch plates have central holes slidably receiving said hub portion with both plates situated at the same side of said flange, and
   said means mounting said clutch plates on said hub comprises fasteners extending through said plates and flange and other fasteners extending through said plates.

10. A clutch plate assembly according to claim 9 wherein:
    said spring means comprises a spring plate between said clutch plates.

11. A clutch comprising:

a flywheel having a rotation axis, a shaft coupling on said axis, and a clutch facing on one side of the flywheel, pressure plate means coaxially positioned at said one side of and movable toward and away from said flywheel and having a clutch facing on the side of the plate facing said flywheel, and a clutch plate assembly coaxially disposed between said flywheel and pressure plate including a hub coaxial with said shaft coupling, first and second clutch plates coaxially mounted on said hub with the plates disposed in planes normal to said axis and with said first clutch plate adjacent said flywheel, whereby the clutch plates have inner sides facing one another and outer sides facing said flywheel and pressure plate, respectively, connecting means joining said clutch plates to one another and to said hub for limited movement of said clutch plates along said axis relative to one another and to said hub, clutch facings on said outer clutch plate sides opposite said flywheel clutch facing and pressure plate clutch facing, respectively and spring means between said clutch plates urging said clutch plates away from one another to separated limiting positions relative to one another and to said hub, and means for moving said pressure plate toward said flywheel to a clutch engaged position wherein said clutch plates are firmly gripped between said flywheel and pressure plate with the clutch facings on said flywheel and first clutch plate and the clutch facings on said pressure plate and second clutch plate in firm frictional driving contact with one another.

12. A clutch according to claim 11 wherein:
said spring means comprises a spring plate between said clutch plates.

13. A clutch according to claim 11 wherein:
said spring means comprises a wave spring plate between said clutch plates.

14. A clutch according to claim 11 wherein:
said spring means comprises a spring plate between said clutch plates having an outer perimeter, a medial plane normal to said axis, and radial slots spaced circumferentially about and opening through the outer perimeter of the spring plate so as to form spring vanes between the adjacent slots which are resiliently flexible transverse to said plane and have radially outer extremities, and wherein said vanes have unstressed states wherein the radially outer extremities of said vanes project substantially equal distances to opposite sides of said medial plane, and said vanes bear against said inner sides of said clutch plates to resiliently urge said clutch plates apart.

15. A clutch according to claim 11 wherein:
said spring means comprises a wave spring plate between said clutch plates having an outer perimeter, a medial plane normal to said axis, and radial slots spaced circumferentially about and opening through the outer perimeter of the spring plate so as to form spring vanes between the adjacent slots which are resiliently flexible transverse to said plane, and wherein each vane has first and second arcuate portions extending radially of the vane and spaced circumferentially of the spring plate, said first arcuate portion has a convex side projecting to one side of said medial plane and an opposite concave side, said second arcuate portion has a convex side projecting to the opposite side of said medial plane and an opposite concave side, said vanes have an unstressed state wherein said convex vane portions project substantially equal distances to opposite sides of said medial plane, and said convex vane portions bear against said inner sides of said clutch plates to urge said clutch plates apart.

16. A clutch according to claim 11 wherein:
said hub has a coaxial cylindrical portion and a radial flange surrounding said hub portion in plane normal to said axis, said clutch plates are mounted on and movable along said hub portion, and said connecting means comprise means securing said plates to one another and to said flange.

17. A clutch according to claim 11 wherein:
said hub has a coaxial cylindrical portion and a radial flange surrounding said hub portion in plane normal to said axis, said clutch plates have central holes slidably receiving said hub portion with both plates situated at the same side of said flange, and said means mounting said clutch plates on said hub comprises fasteners extending through said plates and flange and other fasteners extending through said plates.

18. A clutch according to claim 11 wherein:
said clutch plates comprise aluminum discs each having an outer perimeter, and circumferentially spaced radial slots opening through said outer perimeter and forming between the adjacent slots radial, laterally flexible vanes having outer sides at said outer sides of said clutch plates, and said clutch facings comprise facing rings coaxial with said discs and secured to the outer sides of said vanes.

19. A clutch according to claim 11 wherein:
said hub includes a plate mounting portion, said connecting means comprise means securing said plates to one another and to said plate mounting portion.

20. A clutch according to claim 19 wherein:
said spring means comprises a spring plate between said clutch plates.

21. A clutch according to claim 19 wherein:
said spring means comprises a wave spring plate between said clutch plates.

22. A clutch according to claim 19 wherein:
said spring means comprises a spring plate between said clutch plates having an outer perimeter, a medial plane normal to said axis, and radial slots spaced circumferentially about and opening through the outer perimeter of the spring plate so as to form spring vanes between the adjacent slots which are resiliently flexible transverse to said plane and have radially outer extremities, and wherein said vanes have unstressed states wherein the radially outer extremities of said vanes project substantially equal distances to opposite sides of said medial plane, and said vanes bear against said inner sides of said clutch plates to resiliently urge said clutch plates apart.

23. A clutch according to claim 19 wherein:
said spring means comprises a wave spring plate between said outer plates having an outer perimeter, a medial plane normal to said axis, and radial slots spaced circumferentially about and opening through the outer perimeter of the spring plate so as to form spring vanes between the adjacent slots which are resiliently flexible transverse to said plane and have radially outer extremities, and wherein each vane has first and second arcuate portions extending radially of the vane and spaced circumferentially of the spring plate, said first arcuate portion has a convex side projecting to one side of said medial plane and an opposite concave side, said second arcuate portion has a convex side projecting to the opposite side of said medial plane and an opposite concave side, said arcuate vane portions have radially outer edges which together form the outer perimeter of said spring plate, said first and second arcuate vane portions are arranged in alternate sequence around the spring plate, said vanes have unstressed states wherein said convex vane portions project substantially equal distances to opposite sides of said medial plane in such a way that said spring plate outer perimeter has an undulating shape, and said convex vane portions bear against said inner sides of said clutch plates to urge said clutch plates apart.

24. A clutch plate, comprising:

an aluminum disc having an outer perimeter, and circumferentially spaced radial slots opening through said outer perimeter and forming between the adjacent slots radial, laterally flexible vanes having outer sides at one side of said disc, and a clutch facing ring coaxial with said disc and secured to the outer sides of said vanes.

25. A clutch plate assembly comprising:

a hub having a rotation axis, a pair of clutch plates coaxially mounted on said hub with the plates disposed in planes normal to said axis, whereby the plates have inner confronting sides and opposite outer sides, connecting means joining said clutch plates to one another and to said hub for limited movement of said plates along said axis relative to one another and to said hub, clutch facings on said outer clutch plate sides, spring means between said clutch plates urging said plates away from one another to separated limiting positions relative to one another and to said hub, and wherein said spring means comprises a spring plate between said clutch plates having an outer perimeter, a medial plane normal to said axis, and radial slots spaced circumferentially about and opening through the outer perimeter of the spring plate so as to form spring vanes between the adjacent slots which are resiliently flexible transverse to said plane and have radially outer extremities, and wherein said vanes having unstressed states wherein the radially outer extremities of said vanes project substantially equal distances to opposite sides of said medial plane, and said vanes bear against said inner sides of said clutch pieces to resiliently urge said clutch plates apart.

26. A clutch plate assembly comprising:

a hub having a rotation axis, a pair of clutch plates coaxially mounted on said hub with the plates disposed in planes normal to said axis, whereby the plates have inner confronting sides and opposite outer sides, connecting means joining said clutch plates to one another and to said hub for limited movement of said plates along said axis relative to one another and to said hub, clutch facings on said outer clutch plate sides, spring means between said clutch plates urging said plates away from one another to separated limiting positions relative to one another and to said hub, and wherein said spring means comprises a wave spring plate between said clutch plates having an outer perimeter, a medial plane normal to said axis, and radial slots spaced circumferentially about and opening through the outer perimeter of the spring plate so as to form spring vanes between the adjacent slots which are resiliently flexible transverse to said plane, and wherein each vane has first and second arcuate portions extending radially of the vane and spaced circumferentially of the spring plate, said first arcuate portion has a convex side projecting to one side of said medial plane and an opposite concave side, said second arcuate portion has a convex side projecting to the opposite side of said medial plane and an opposite concave side, said vanes have unstressed states wherein said convex vane portions project substantially equal distances to opposite sides of said medial plane, and said convex vane portions bear against said inner sides of said clutch plates to urge said clutch plates apart.

* * * * *